United States Patent [19]
Shibazaki

[11] Patent Number: 5,581,675
[45] Date of Patent: Dec. 3, 1996

[54] METHOD OF AND APPARATUS FOR CONVERTING FORMAT OF AN IMAGE HAVING LINEAR COLOR VARIATION

[75] Inventor: Hiroshi Shibazaki, Kyoto, Japan

[73] Assignee: Dainippon Screen Mfg. Co., Ltd., Kyoto, Japan

[21] Appl. No.: 336,693

[22] Filed: Nov. 7, 1994

[30] Foreign Application Priority Data

Nov. 18, 1993 [JP] Japan .................................. 5-314528

[51] Int. Cl.⁶ ...................................................... G06F 15/00
[52] U.S. Cl. ........................................................... 395/131
[58] Field of Search ............................ 395/131; 382/241, 382/248, 249; 358/75, 76

[56] References Cited

U.S. PATENT DOCUMENTS 4,694,405  9/1987  Bradbury et al. ........................ 395/131

FOREIGN PATENT DOCUMENTS 0324271   12/1988  European Pat. Off. .
0455351A2  4/1991  European Pat. Off. .
0455366A1 11/1991  European Pat. Off. .
2-2594     1/1990  Japan .............................. G09K 5/06
8800503    1/1988  United Kingdom .

Primary Examiner—Phu K. Nguyen
Attorney, Agent, or Firm—Lowe, Price, LeBlanc & Becker

[57] ABSTRACT

An image approximate to a vignette is to be generated from image data representing a first set of color steps CS1. A second set of color steps CS2 is first created from the first set of color steps CS1, where the second set of color steps CS2 has a plurality of figures inserted at equal intervals between two end figures of the first set of color steps CS1. Binary noise data BS are then generated in the vicinity of the boundary of each figure of the second color steps. Vignette image data VID approximately representing a vignette is generated by adding the binary noise data BS to bit map data of the second set of color steps CS2. Accordingly, a tone jump is eliminated from the image approximate to a vignette.

14 Claims, 14 Drawing Sheets

Fig. 2(A)
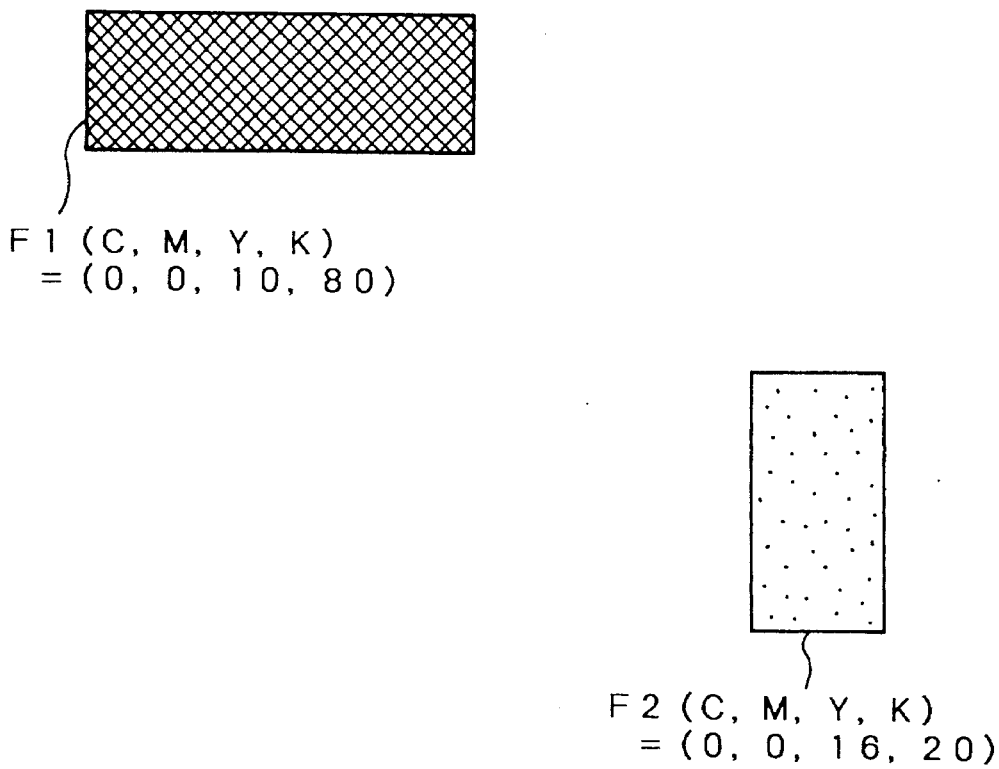
F1 (C, M, Y, K)
  = (0, 0, 10, 80)
F2 (C, M, Y, K)
  = (0, 0, 16, 20)
Fig. 2(B) FIRST COLOR STEPS CS1
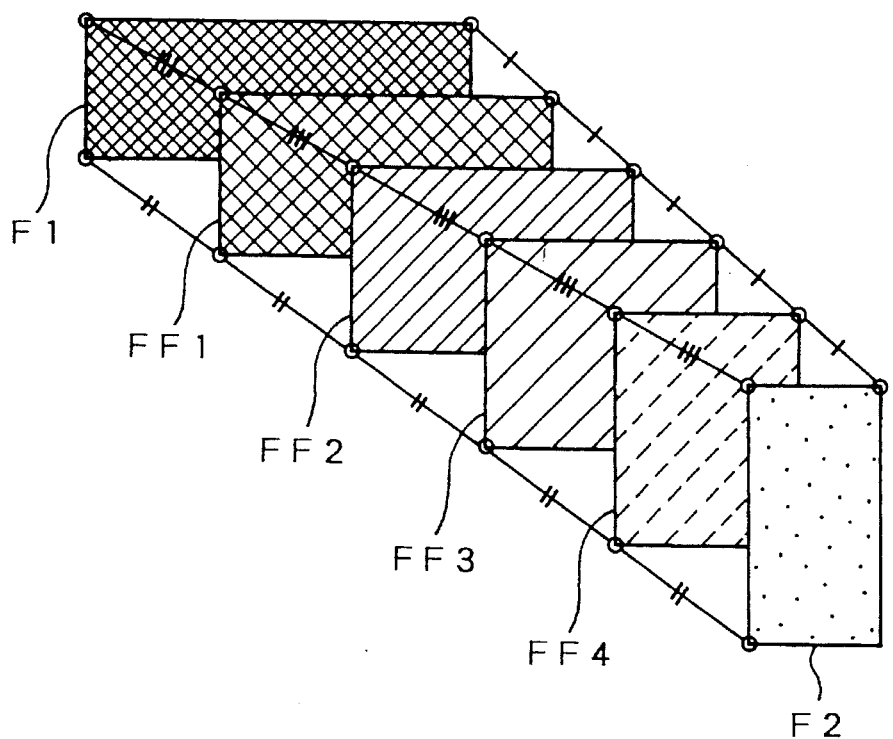

SECOND COLOR STEPS CS2

F1 (0, 0, 10, 80)

AR

- NUMBER OF STEPS N
  = 60 ÷ 0.5
  = 120
- TOTAL NUMBER OF FIGURES
  = 121

F2 (0, 0, 16, 20)

COLOR STEPS

VIGNETTE

METHOD OF AND APPARATUS FOR CONVERTING FORMAT OF AN IMAGE HAVING LINEAR COLOR VARIATION

BACKGROUND OF THE INVENTION

1. Field of the Invention

The present invention relates to a method of and an apparatus for converting an image of color steps to a vignette-like image.

2. Description of the Related Art

With a recent development of computer science and technology, a variety of special color images are created with personal computers or workstations. One of such special color images is generally called color steps. FIG. 14 is a plan view illustrating an example of a set of color steps.

The color steps consist of a plurality of figures G1 through Gn which are laid one upon another at equal intervals along a predetermined direction and have linearly changing shapes and colors. As illustrated in FIG. 14, the distance between the corresponding corners of every neighboring figures is identical, and the shape is varied linearly from the back-most figure G1 to the front-most figure Gn. The figures are filled uniformly with respective colors. The color is also varied linearly from the back-most figure G1 to the front-most figure Gn. The terminology 'difference in the color' includes even a difference in the density only (or brightness) in this specification.

A vignette image is relatively similar to color steps. FIG. 15 is a plan view illustrating an example of the vignette image. The vignette image is a figure G which is filled with continuously changing color.

Some application programs generally used for image processing with personal computers or workstations easily create color steps but not a vignette. Even in such a case, a vignette can be approximated with color steps.

When a vignette is approximated with color steps, the respective figures of the color steps are slightly different in colors, and therefore a tone jump is often observed on the boundary of every neighboring figures. Since a real vignette is an image having a continuous color variation without any tone jumps, the tone jump is accordingly recognized as deterioration of the picture quality. There is a demand for effectively eliminating the tone jumps in a vignette-like image approximated with color steps.

SUMMARY OF THE INVENTION

An object of the present invention is to reduce tone jumps in a vignette-like image approximated with color steps.

The present invention is directed to a method of generating vignette image data approximately representing a vignette image having a continuous linear color variation. The method comprises the steps of: providing first color step image data representing a first set of color step image including a plurality of figures which are arranged at equal intervals along a predetermined direction to be laid one upon another and filled uniformly with different colors, shapes and colors of the plurality of figures changing linearly in order; determining, based on the first set of color step image data, a difference between first color data indicating a color of a first figure arranged in a back-most position among the plurality of figures and second color data indicating a color of a second figure arranged in a front-most position among the plurality of figures; dividing the difference by a predetermined step width to obtain an integer N; generating a second set of color step image which comprises (N+1) pieces of figures including the first figure, the second figure, and (N−1) pieces of figures arranged between the first and second figures at equal intervals, and generating second color step image data representing a color of each pixel in the second set of color step image; generating a color data noise with respect to every neighboring pair of the (N+1) pieces of figures, within a predetermined range from a boundary of the every neighboring pair; and adding the color data noise to the second set of color step image data to generate vignette image data approximately representing a vignette image.

The smaller value of the step width will make a smaller difference in color data between neighboring figures of the second color step image. Since the vignette image data are generated by adding a noise to the second color step image data, tone jumps becomes sufficiently inconspicuous near the boundary of every neighboring figures.

In the preferred embodiment, the step of generating the color data noise comprises the steps of: generating a noise offset whose value has a predetermined variation within the predetermined range; generating a random noise at least within the predetermined range; adding the noise offset and the random noise to obtain a multi-digital noise; and binarizing the multi-digital noise to obtain the color data noise.

Preferably, a maximum value of the noise offset is equal to a maximum value of the random noise.

The step of binarizing comprises the step of binarizing the multi-digital noise by the maximum value of the noise offset and the random noise According to an aspect of the present invention, the step of providing the first set of color step image data comprises the step of providing the first set of color step image data expressed by a first page-description-program; and the step of generating the second set of color step image data comprises the step of generating the second set of color step image data expressed by a second page-description-program The method further comprises the steps of: before the step of determining the difference, extracting a plurality of component programs describing the plurality of figures from the first page description program; and wherein the step of generating the second set of color step image comprises the step of generating (N+1) pieces of component programs describing the (N−1) pieces of figures arranged between the first and second figures.

The step of extracting the plurality of component programs comprises the steps of: examining a color data difference and a positional difference for neighboring pairs of the plurality of figures; and extracting at least three component programs describing figures which has substantially identical values of the color data difference and the positional difference, respectively.

The present invention is also directed to an apparatus for converting first color step image data representing a first set of color-step image to vignette image data approximately representing a vignette image having a continuous linear color variation, the first color step image consisting of a plurality of figures which are arranged at equal intervals along a predetermined direction to be laid one upon another and filled uniformly with different colors, shapes and colors of the plurality of figures changing linearly in order. The apparatus comprises: image correction means for determining, based on the first set of color step image data, a difference between first color data indicating a color of a first figure arranged in a back-most position among the plurality of figures and second color data indicating a color of a second figure arranged in a front-most position among the plurality of figures, and dividing the difference by a predetermined step width to obtain an integer N; image correction means for generating a second set of color step image which comprises (N−1) pieces of figures including the first figure, the second figure, and (N−1) pieces of figures arranged between the first and second figures at equal intervals, and generating second color step image data representing a color of each pixel in the second set of color step image; noise generation means for generating a color data noise with respect to every neighboring pair of the (N+1) pieces of figures, within a predetermined range from a boundary of the every neighboring pair; and addition means for adding the color data noise to the second set of color step image data to generate vignette image data approximately representing a vignette image.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 2(A) and 2(B) show a process of creating color steps;

DESCRIPTION OF THE PREFERRED EMBODIMENT

A. System Structure

Figure 1:
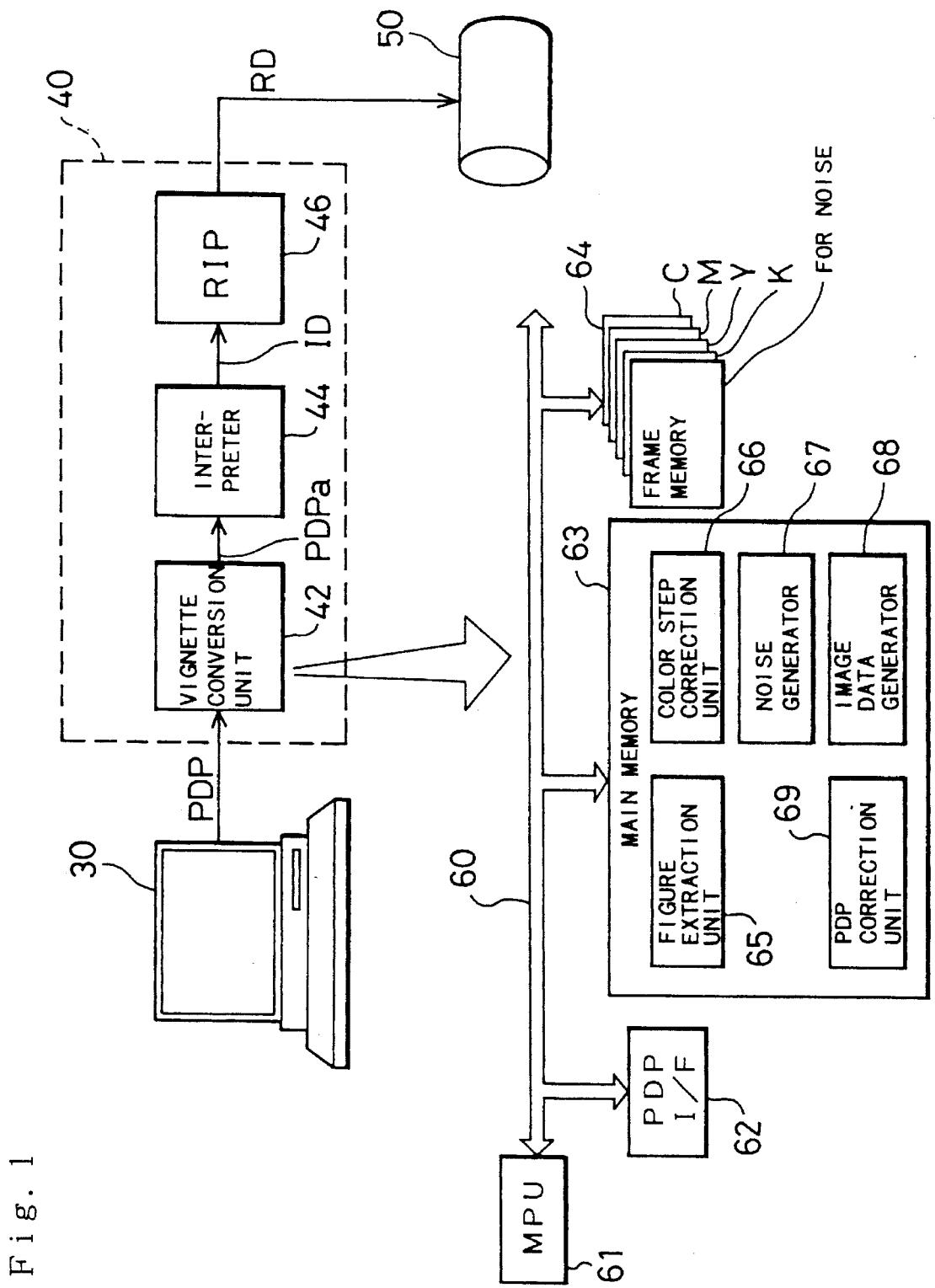
FIG. 1 is a block diagram illustrating an image processing system embodying the present invention.

FIG. 1 is a block diagram illustrating an image processing system embodying the present invention. The image processing system comprises an image processing workstation 30, an image data conversion device 40, and an image recorder unit 50.

The image processing workstation 30 creates a variety of image parts such as color steps and lays out these image parts on an image plane to generate a one-page image. The one-page image is expressed by a page description program PDP, which is written in a page description language (PDL) such as PostScript (trademark of Adobe Corporation). The first set of color steps image data of the present invention corresponds to that portion of the page description program PDP which represents color steps.

The image data conversion device 40 includes a vignette conversion unit 42, an interpreter 44, and a raster image processor (RIP) 46. The vignette conversion unit 42 extracts a specific program part representing color steps from the page description program PDP given from the image processing workstation 30 and converts the specific program part into a vignette-representing program part. The vignette conversion unit 42 comprises a microprocessor (MPU) 61, a page description program interface 62, a main memory 63, and a frame memory 64, which are connected to one another via an MPU bus 60. The main memory 63 stores software programs for vignette conversion. Execution of the software programs by the MPU 61 implements functions of a figure extraction unit 65, color step correction unit 66, a noise generator 67, an image data generator 68, and a page description program correction unit 69. Details of these units 65 through 69 will be described later. The frame memory 64 includes four memory areas corresponding to four color separations of C (cyan), M (magenta), Y (yellow), and K (black), respectively, and, in addition, a noise frame memory area. Each of the four memory areas for the color separations has a depth of 8 bits whereas the noise frame memory area has a depth equal to the number of bits of the noise generated by the noise generator 67. Since the noise level is within a range of 0 through 18 in this embodiment as described later, the required depth of the noise frame memory area is 5 bits.

The interpreter 44 interprets a page description program PDPa corrected by the vignette conversion unit 42, and generates image data ID representing characters, figures, and pictures. The RIP 46 converts the image data ID transmitted from the interpreter 44 to raster data RD and supplies the raster data RD to the image recorder unit 50. The image recorder unit 50 records halftone dot images of the one-page image as a function of the raster data RD on a photosensitive film.

B. Vignette Conversion

FIG. 2 shows a process of creating color steps with the image processing workstation 30. An user first defines shapes of two figures F1 and F2 with a mouse and specifies dot percents of the color separations of C, M, Y, and K in each figure as illustrated in FIG. 2(A). The two figures F1 and F2 are not necessarily similar figures as long as the figures F1 and F2 have an identical number of vertices. When the figures F1 and F2 are expressed by PostScript, the page description program representing the figures F1 and F2 is as follows:

| [Program listing 1] |
| --- |
| newpath |
| 0 0 0.1 0.8 setcmykcolor |
| 225 484.5 moveto |
| 82 484.5 lineto |
| 82 535.5 lineto |
| 225 535.5 lineto |
| 225 484.5 lineto |
| eofill |
| newpath |
| 0 0 0.16 0.2 setcmykcolor |
| 377 309.5 moveto |
| 328 309.5 lineto |

[Program listing 1]

```
328 404.5 lineto
377 404.5 lineto
377 309.5 lineto
eofill
showpage
```

The operators used in the program listing 1 respectively denote the following operations:

newpath: representing a start of a current path;

setcmykcolor: setting the dot percents of the four color separations of C (cyan), M (magenta), Y (yellow), and K (black);

moveto: specifying coordinates (x, y) at a starting point of the current path; The third line of the program listing 1 specifies the starting point at (225, 484.5).

lineto: adding a line to the current path; Two numeral before the operator 'lineto' represents coordinates (x, y) after a movement. The third line and the fourth line of the program listing 1 thus give a linear path from the coordinates (225, 484.5) to the coordinates (82,484.5).

eofill: determining inside of the current path according to the odd-and-even rule and filling the inside of the current path. In the program of the program listing 1, two program portions from 'newpath' to 'eofill' represent shapes and colors of the two figures F1 and F2, respectively.

showpage: transmitting a current page (page described by the program) to an output device. This operator works to actually output an image described by the program.

When the user instructs creation of color steps which divide the space between the two figures F1 and F2 into five parts, the image processing workstation 30 creates the color steps as illustrated in FIG. 2(B). The color steps include four figures FF1 through FF4 arranged between the first figure F1 and the second figure F4. As clearly seen in FIG. 2(B), the corresponding vertices of the figures F1, FF1 through FF4, and F2 are arranged in a straight line at equal intervals, and colors of the figures change linearly. The page description program representing the first set of color steps CS1 of FIG. 2(B) is given by the following program listing 2:

[Program listing 2]

```
newpath
0 0 0.1 0.8 setcmykcolor
225 484.5 moveto
82 484.5 lineto
82 535.5 lineto
225 535.5 lineto
225 484.5 lineto
eofill
newpath
0 0 0.112 0.68 setcmykcolor
255.3995 449.5005 moveto
131.1992 449.5005 lineto
131.1992 509.3004 lineto
255.3995 509.3004 lineto
255.3995 449.5005 lineto
eofill
newpath
0 0 0.124 0.56 setcmykcolor
285.7991 414.5011 moveto
180.3985 414.5011 lineto
180.3985 483.1008 lineto
285.7991 483.1008 lineto
285.7991 414.5011 lineto
```

[Program listing 2]

```
eofill
newpath
0 0 0.136 0.44 setcmykcolor
316.2009 379.4989 moveto
229.6015 379.4989 lineto
229.6015 456.8992 lineto
316.2009 456.8992 lineto
316.2009 379.4989 lineto
eofill
newpath
0 0 0.148 0.32 setcmykcolor
346.6005 344.4995 moveto
278.8007 344.4995 lineto
278.8007 430.6996 lineto
346.6005 430.6996 lineto
346.6005 344.4995 lineto
eofill
newpath
0 0 0.16 0.2 setcmykcolor
377 309.5 moveto
328 309.5 lineto
328 404.5 lineto
377 404.5 lineto
377 309.5 lineto
eofill
showpage
```

The program listing 2 is a page description program PDP supplied from the image processing workstation 30 to the image data conversion device 40. Such page description programs can be prepared using a commercially available DTP (Desk Top Publishing) program.

Figures and pictures constituting one page image are generally referred to as 'page components'. Programs representing the respective images parts such as figures and pictures are accordingly hereinafter referred to as 'component programs'. The program listing 2 consists of six component programs. One page component is created every time when interpretation of one component program of the page description program is completed. When a plurality of page components are included in one page image, page components are successively overlaid in the order of the component programs in the page description program. In the program listing 2, a component program for the back-most figure F1 among the plural figures of FIG. 2(B) through a component program for the front-most figure F2 are arranged in order.

Figure 3:
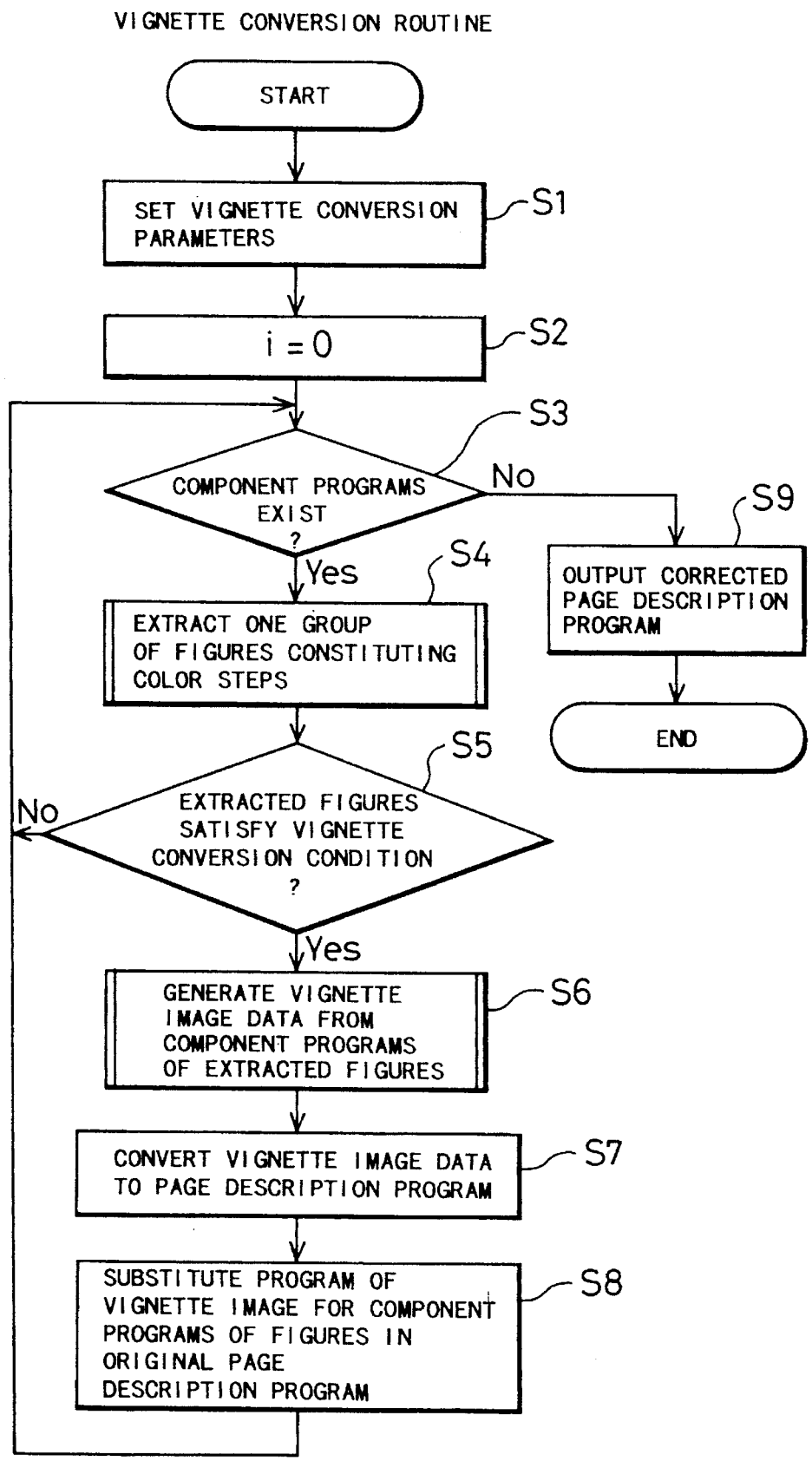
FIG. 3 is a flowchart showing a routine of vignette conversion.

FIG. 3 is a flowchart showing steps of vignette conversion executed by the vignette conversion unit 42. The vignette conversion process extracts a set of component programs representing the color steps from the page description program PDP supplied from the image processing workstation 30, and converts the extracted component programs to specific component programs representing an approximate image to a vignette.

At step S1, the user specifies the following vignette conversion parameters:

Noise mixing width W1: a width (in the unit of the number of points) for defining a noise generation range on the boundary of every neighboring figures; One point denotes $1/72$ inch. For example, W1 is set equal to 10 points.

Resolution of image data Res: a resolution of vignette image data; For example, Res is set equal to 350 dpi (dot per inch).

Noise mixing strength St: The noise mixing strength is, for example, set in one of three levels, 'Weak' 'Medium', and 'Strong'.

Dot percent GB for vignette conversion: a variation in dot percent between every neighboring figures, on which it is determined whether the extracted figures are to be converted to a vignette or not; For example, GB is set equal to 2 percent.

Distance Lis for vignette conversion: a difference in distance between every neighboring figures, on which it is determined whether the extracted figures are to be converted to a vignette or not; For example Lis is set equal to 30 points.

Boundary smoothing switch SW: When SW=1, the boundary of the first set of color steps is smoothed before creation of a vignette. When SW=0, a vignette is created while the boundary of the first set of color steps is kept as it is.

At step S2, a pointer i representing the ordinal number of the component programs is initialized to zero. The pointer i is mainly used at step S4 described later. At step S3, it is determined whether any component programs are left in the whole page description program to be subject to the vignette conversion. When a non-processed component program exists, the figure extraction unit 65 (FIG. 1) extracts a group of figures constituting color steps at step S4. The group of figures constituting color steps are arranged at regular intervals along a predetermined direction to be laid one upon another and have shapes and colors changing linearly. In this embodiment, it is assumed that all the figures F1, FF1 through FF4, and F2 in one page image constitute one color step as shown in FIG. 2(B). Details of step S4 will be described later.

At step S5, it is determined whether the figures extracted at step S4 satisfies the following vignette conversion condition:

VIGNETTE CONVERSION CONDITION: $\Delta Dmax \leq GB$ AND $\Delta Lmax \leq Lis$ $\Delta D_{max} = Max\{\Delta D(C), \Delta D(M), \Delta D(Y), \Delta D(K)\}$ $\Delta D(C) = C_i - C_{i+1}$ $\Delta D(M) = M_i - M_{i+1}$ $\Delta D(Y) = Y_i - Y_{i+1}$ $\Delta D(K) = K_i - K_{i+1}$ $\Delta L_{max} = Max\{\sqrt{(x_i - x_{i+1})^2 - (y_i - y_{i+1})^2}\}$ wherein $\Delta Dmax$ denotes the maximum of four color data differences $\Delta D(C)$, $\Delta D(M)$, $\Delta D(Y)$, and $\Delta D(K)$ between every neighboring ones of the extracted figures, and $\Delta L$ denotes the maximum distance between the corresponding vertices of every neighboring figures.

When $\Delta Dmax$ is equal to zero, colors of the neighboring figures are quite similar to each other. The extracted figures are thereby determined not to satisfy the vignette conversion condition.

The values of the parameters GB and Lis for the vignette conversion have been set in advance at step S1 as described before. When the extracted figures do not satisfy the vignette conversion condition, the procedure returns to step S3 to execute processing for a subsequent component program. When the extracted figures satisfy the vignette conversion condition, on the other hand, the procedure goes to step S6 at which vignette image data are generated from the component program for the extracted figures.

Figure 4:
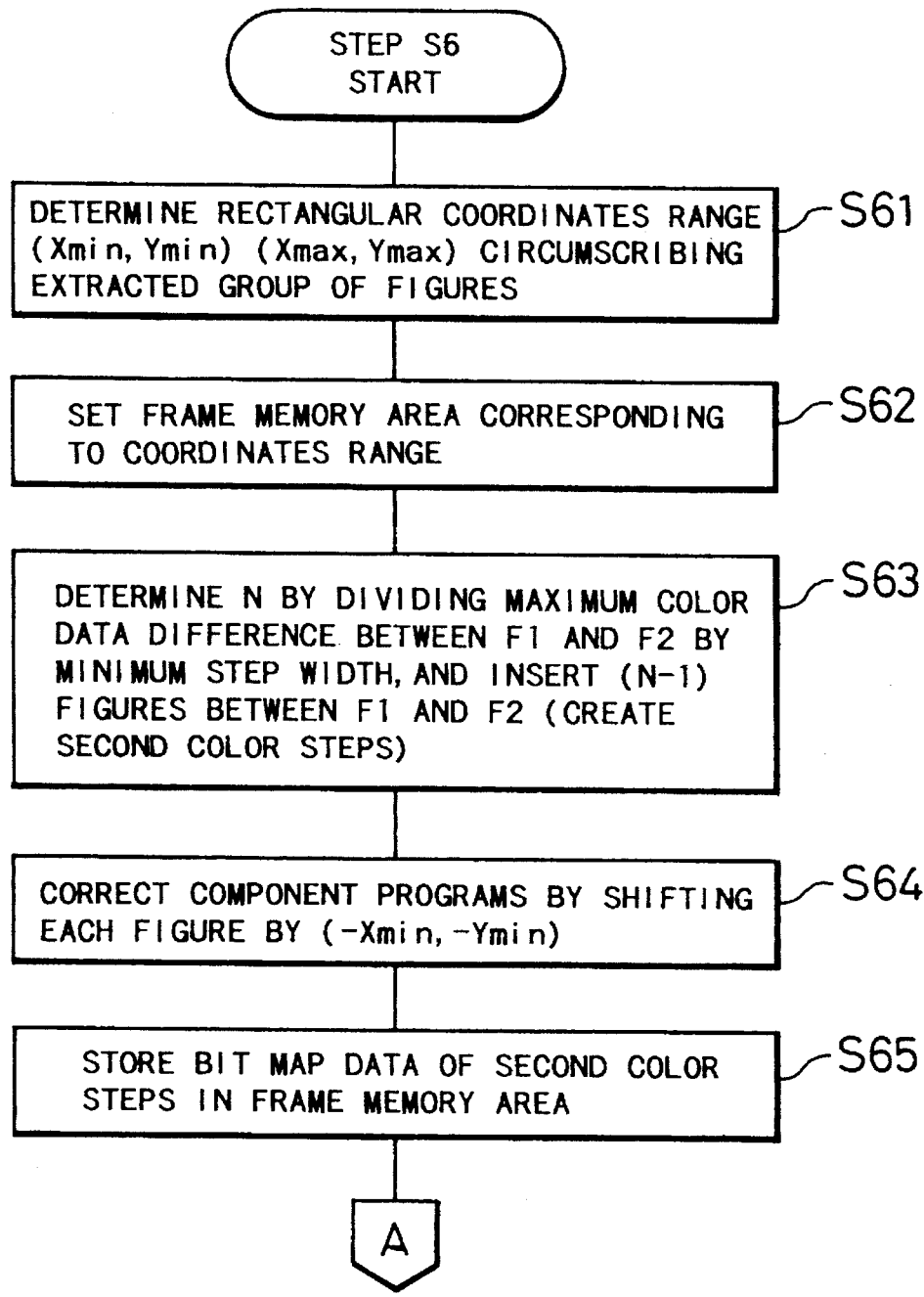
FIG. 4 is a flowchart showing details of the routine of vignette image data generation.
Figure 5:
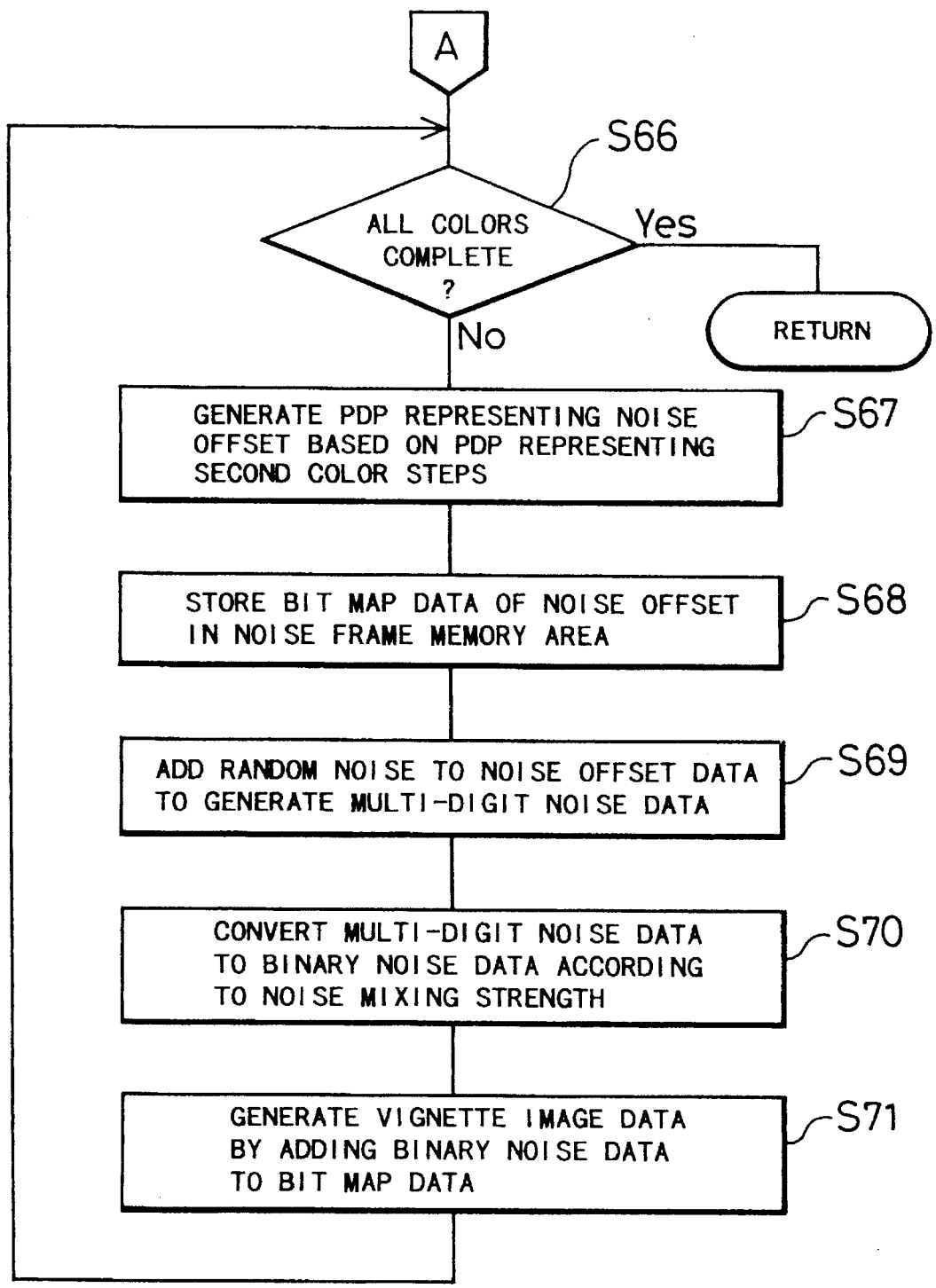
FIG. 5 is a flowchart showing details of the routine of vignette image data generation.

FIGS. 4 and 5 are flowcharts showing details of the processing at step S6. Steps S61 through S67 are executed by the color step correction unit 66 (FIG. 1), steps S68 through S70 by the noise generator 67, and step S71 by the image data generator 68, respectively.

Figure 6:
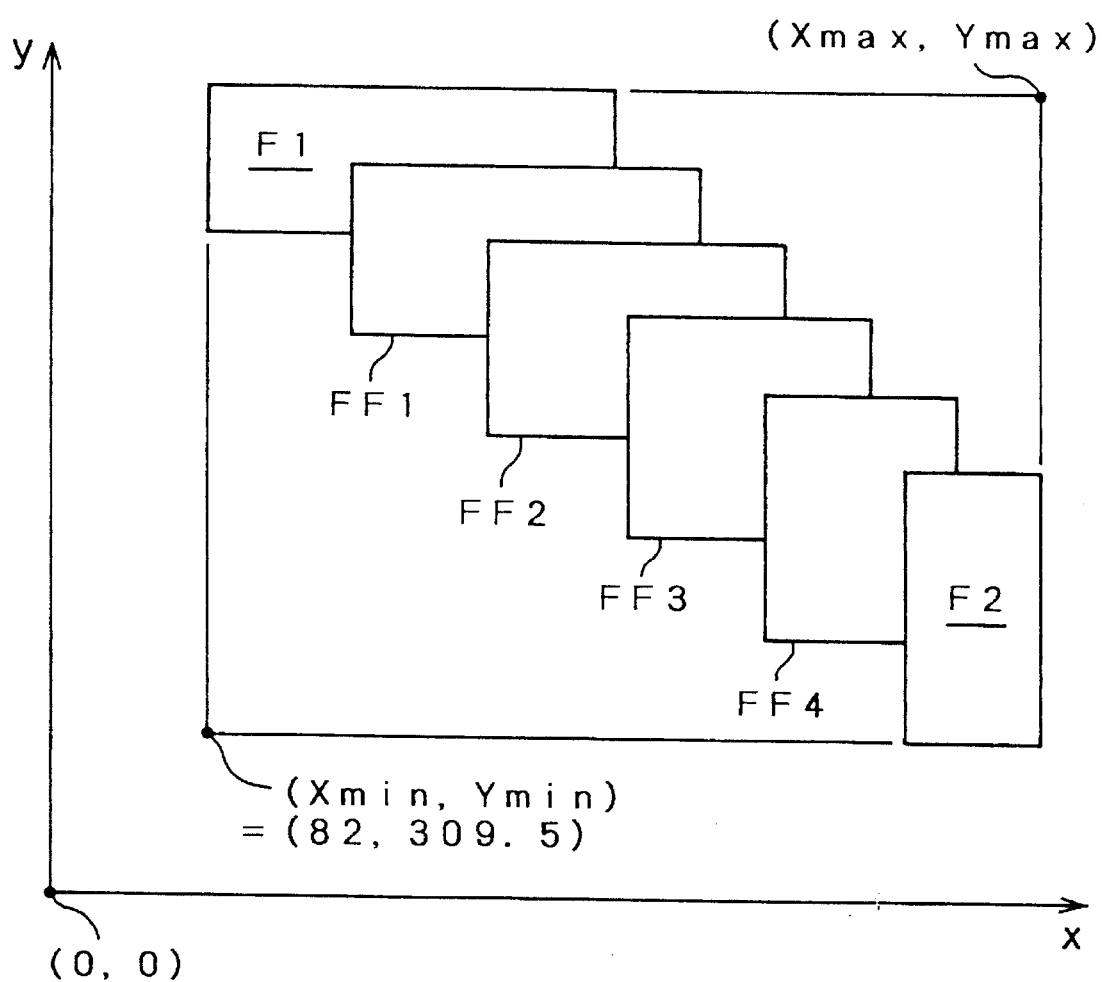
FIG. 6 is a plan view illustrating a coordinates range of figures subject to the vignette image data generation process.

At step S61, the color step correction unit 66 determines a coordinate range of the extracted group of figures, or coordinates $(x_{min}, y_{min})$ and $(x_{max}, y_{max})$ of diagonal corners of a rectangular circumscribing the extracted group of figures. FIG. 6 is a plan view showing the coordinates range of the figures. The coordinates range of the figures is specified with the maximum and the minimum of vertex coordinates of the back-most figure F1 of the extracted figures and vertex coordinates of the front-most figure F2 as clearly shown in FIG. 6. In the example of FIG. 6, the coordinates $(x_{min}, y_{min})$ are equal to (82, 309.5) in the unit of the number of points.

At step S62, a frame memory area corresponding to the coordinates range is secured in the frame memory 64 (FIG. 1). The frame memory area corresponding to the coordinates range is defined by an x dimension of $(x_{max}-x_{min})/(72Res)$ and a y dimension of $(y_{max}-y_{min})/(72Res)$, where Res represents the resolution (dpi) of image data set at step S1 in the flowchart of FIG. 3.

At step S63, the color step correction unit 66 (FIG. 1) determines the maximum of color data differences between the first figure F1 at the back-most position among the extracted figures and the second figure F2 at the front-most position among the extracted figures. The number of steps N is then determined by dividing the maximum color data difference by a predetermined minimum step width of color data. A new set of (N-1) figures are then arranged at specific positions determined by dividing the distance between the two figures F1 and F2 into N equal portions.

Figure 7:
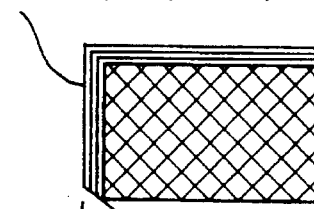
FIG. 7 shows a second set of color steps.

FIG. 7 shows the processing executed at step S63. The first figure F1 has color data of (C, M, Y, K)=(0, 0, 10, 80) whereas the second figure F2 has color data of (C, M, Y, K)=(0, 0, 16, 20). The maximum color data difference is accordingly 60 percent (the difference in the K color separation). When a minimum step width dmin of color data is set equal to 0.5 percent, the number of steps N becomes equal to 60/0.5=120. The minimum step width dmin of color data is, for example, set equal to a minimum resolution of image data in the image recorder unit 50. The minimum resolution of image data is a dot percent corresponding to the value '1' of the least significant bit of image data. In this embodiment, the value '1' of the LSB of 8-bit color data corresponds to 0.5 dot percent. Alternatively, any arbitrary value may be set for the minimum step width of color data.

Since the number of steps N is equal to 120 in the example of FIG. 7, 119 figures are newly created between the first and the second figures F1 and F2. These new 119 figures and the two original figures F1 and F2 constitute a second set of color steps CS2. The corresponding vertices of the 121 figures are arranged in a straight line at equal intervals while the 121 figures are filled uniformly with respective colors changing linearly in order.

The second set of color steps CS2 is created by generating component programs for the newly created 119 figures based on the page description program (Program listing 2) of the first set of color steps CS1 and substituting the component programs of the 119 figures for the component programs of the figures FF1 through FF4. Namely, the processing of step S63 in the flowchart of FIG. 4 is implemented simply by correcting the page description program of Program listing 2. The following Program listing 3 shows the corrected page description program thus obtained for the second set of color steps CS2:

[Program listing 3]

newpath
0 0 0.1 0.8 setcmykcolor
225 484.5 moveto

-continued

[Program listing 3]

```
82 484.5 lineto
82 535.5 lineto
225 535.5 lineto
225 484.5 lineto
eofill
newpath
0 0 0.1005 0.795 setcmykcolor
226.2664 483.042 moveto
84.0495 483.042 lineto
84.0495 534.4086 lineto
226.2664 534.4086 lineto
226.2664 483.042 lineto
eofill
 . . .
 . . .
 . . .
newpath
0 0 0.1595 0.205 setcmykcolor
375.7336 310.958 moveto
325.9505 310.958 lineto
325.9505 405.5914 lineto
375.7336 405.5914 lineto
375.7336 310.958 lineto
eofill
newpath
0 0 0.16 0.2 setcmykcolor
377 309.5 moveto
328 309.5 lineto
328 404.5 lineto
377 404.5 lineto
377 309.5 lineto
eofill
showpage
```

Color data and coordinates of a current path for the newly created 119 component programs are determined by respectively dividing into 120 portions and interpolating the coordinates (values before the operator 'moveto') of the current path and the color data (values before the operator 'setcmykcolor') for the component programs of the two original figures F1 and F2.

As for the color separation showing the maximum color data difference between the end figures of the second set of color steps CS2, a difference in color data between neighboring figures in the second set of color steps CS2 is equal to the minimum step width dmin. As for the other color separations, the difference in color data between the neighboring figures in the second color data CS2 is smaller than the minimum step width dmin.

At step S64, the component program for each figure is corrected to shift the figure by $(-x_{min}, -y_{min})$. In a concrete operation, $(-x_{min}, -y_{min})$ are added to the coordinates values in front of the operator 'moveto' in each component program of the program listing 3. This procedure allows the following process to be executed in the frame memory area secured at step S62.

At step S65, the color step correction unit 66 interprets the page description program corresponding to the second set of color steps to generate bit map data representing each figure and stores the bit map data in the frame memory area secured at step S62. The bit map data are generated for each of the four color separations of C, M, Y, and K and stored in the respective frame memory areas.

Steps S66 through S71 in the flowchart of FIG. 5 generate vignette image data approximately representing a vignette based on the second set of color steps CS2. FIGS. 8(a) through 8(f) show the processing of steps S66 through S71. FIG. 8(b) shows a distribution of bit map data of the second set of color steps CS2 for the K color separation in the direction of an arrow AR shown in FIG. 7, and FIG. 8(a) shows a distribution of vignette image data VID obtained through the processing of steps S66 to S71.

At step S66, it is determined whether the processing of steps S66 through S71 has been completed for all of the four color separations. When the processing is not completed, another color is selected in the order of C, M, Y, and K and the procedure proceeds to step S67.

At step S67, a page description program representing a noise offset is created on the basis of the page description program of the second set of color steps CS2, or the Program listing 3. FIG. 8(c) shows bit map data of a noise offset SF. The level of the noise offset SF varies in the form of partly jagged triangles, where each triangle has a height of 9. The noise offset SF is equal to zero at a starting position of each figure (boundary between each figure and an neighboring figure of the lighter color) in the second set of color steps CS2 and equal to nine at an end position of the figure (boundary between the figure and an neighboring figure of the darker color). The page description program representing the noise offset SF is created on the assumption that the value '1' of the noise offset SF corresponds to one tenth of the minimum step width dmin of the second set of color steps CS2, that is, 0.05%. The page description program of the noise offset SF consists of a plurality of component programs, where each component program represents each step of the jagged triangle of FIG. 8(c) as one figure. The difference in color data between the neighboring component programs is set equal to 0.05 percent. Namely, the page description program of the noise offset SF consists of a plurality of component programs representing a number of figures, which are interpolated at equal intervals determined by dividing the distance between the neighboring figures of the second set of color steps CS2 into one tenth.

At step S68, the noise generator 67 interprets the page description program of the noise offset SF and stores bit map data of the noise offset SF (hereinafter referred to as noise offset data) in the frame memory area (FIG. 1). In interpretation of the page description program of the noise offset SF, 0.05% in color data (values of the operator 'setcmykcolor') corresponds to the value '1' of the lower-most bit of the bit map data, which gives the distribution shown in FIG. 8(c).

At step S69, the noise generator 67 generates a random noise RN and adds the random noise RN to the noise offset data to generate multi-digit noise data MS. The random noise RN has random values within a range between 0 and 9 as shown in FIG. 8(d). The range of the random noise RN is identical with the range of the noise offset SF while the multi-digit noise data MS has values in a range between 0 and 18 as shown in FIG. 8(e).

At step S70, the multi-digit noise data MS are converted to binary noise data BS with a threshold level corresponding to the noise mixing strength St specified by the user at step S1 in the flowchart of FIG. 3. The threshold level is set equal to 9 for the noise mixing strength St of 'Strong', equal to 10 for 'Medium', and equal to 11 for 'Weak', respectively. FIG. 8(f) shows the binary noise data BS obtained by converting the multi-digit noise data MS with the threshold level of 9. When the multi-digit noise data MS is not greater than 9, the binary noise data BS becomes equal to zero. When the multi-digit noise data MS is greater than 9, on the contrary, the binary noise data BS becomes equal to one. The value '1' in the binary noise data BS corresponds to 0.5% in the unit of halftone dot area rate of color data.

When the noise mixing strength St is 'Strong', the binary noise data BS of a value '1' appears at a relatively high frequency. When the noise mixing strength St is 'Weak', on the other hand, the binary noise data BS of the value '1' appears at a relatively low frequency. The binary noise data BS of the value '1' appears at an intermediate frequency for 'Medium' in the noise mixing strength St. In this manner, the noise mixing strength St adjusts the frequency of the binary noise data BS of the value '1'.

At step S71, vignette image data VID (FIG. 8(a)) of the current color separation are generated by adding the binary noise data BS to the bit map data of the current color separation. It means that the vignette image data VID are generated by adding the binary noise data BS to the image of the second set of color steps CS2 shown in FIG. 7. As clearly seen in FIG. 8(a), the vignette image data VID includes a noise component on the boundary of neighboring figures in the second set of color steps CS2, thereby forming an image where a tone jump on the boundary of the neighboring figures is relatively inconspicuous.

Figure 9:
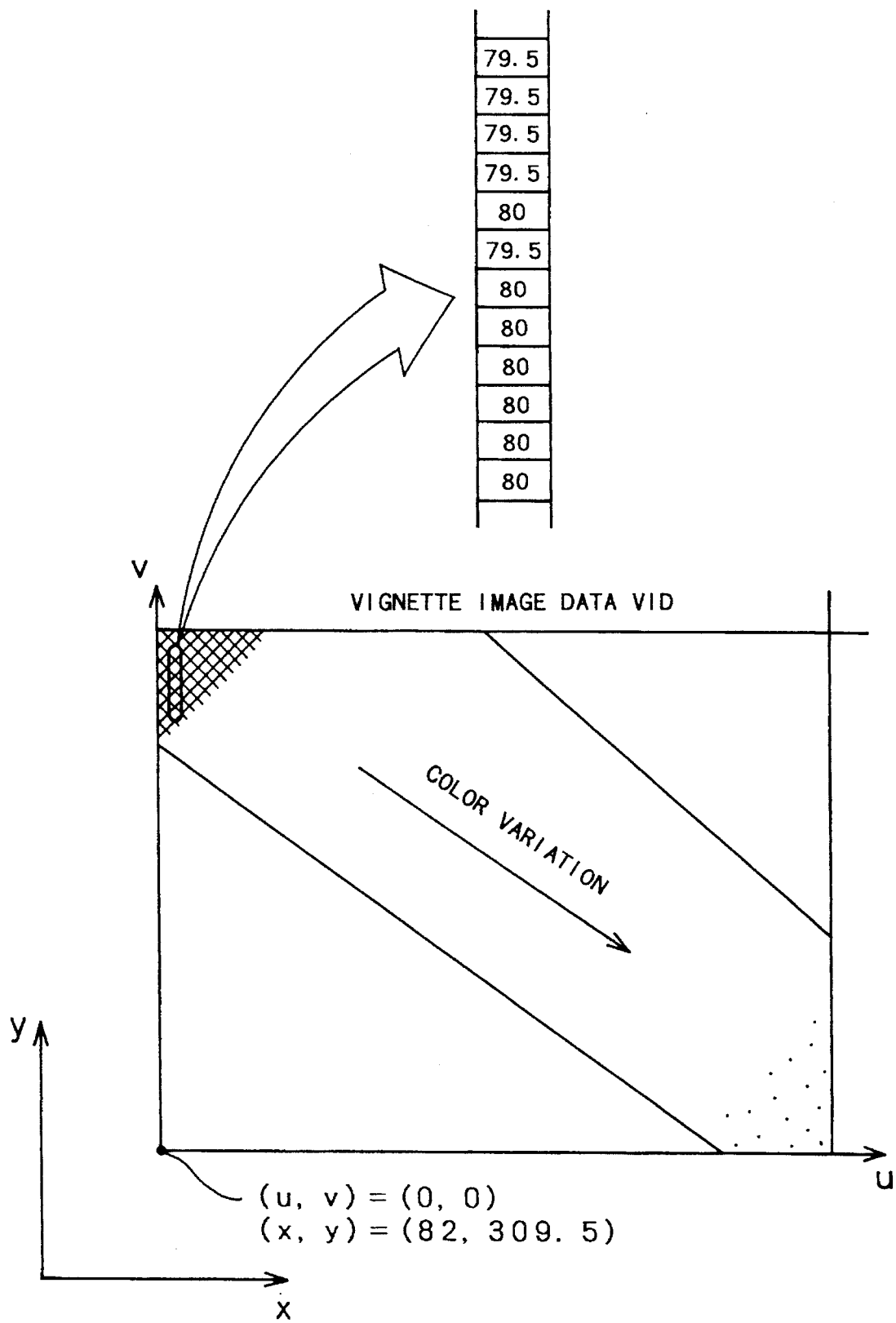
FIG. 9 illustrates an example of vignette image data VID.

FIG. 9 shows the K component of the vignette image data VID as an example, in which the variation in color data is not illustrated. As shown in the upper enlarged view of FIG. 9, the vignette image data VID includes a noise to vary the value irregularly. The vignette image data VID accordingly reproduces an image where tone jumps are highly reduced.

Since the distribution of the binary noise data BS can be varied according to the noise mixing strength St at step S70, the fluctuation of the vignette image data VID can be adjusted to effectively reduce the tone jumps in the vicinity of the boundary of every neighboring figures in the second color steps.

The noise offset SF, an important component of the multi-digit noise data MS, has the greatest value of 9 on the boundary between each figure and an neighboring figure of the darker color and the smallest value of 0 on the boundary between each figure and an neighboring figure of the lighter color. Therefore, the binary noise data BS of the value '1' appears only in the vicinity of the boundary between each figure and an neighboring figure of the darker color. Since the binary noise data BS is added to the bit map data of the second set of color steps CS2, the restricted appearance of the binary noise data BS of the value '1' causes appropriate fluctuation of the color data on the boundary between the neighboring figures, thereby reducing the tone jumps.

On the contrary to the example of FIG. 8(c), the noise offset SF may be set at a smaller value on the boundary between each figure and an neighboring figure of the darker color and a greater value on the boundary between each figure and an neighboring figure of the lighter color. In this case, vignette image data will be generated by subtracting the binary noise data BS from the bit map data of the second set of color steps CS2.

After completion of step S71, the procedure returns to step S66 to start the processing of steps S67 through S71 for another color separation. Vignette image data are generated in this manner for each color separation of C, M, Y, and K.

In the example of FIGS. 8(a) through 8(f), a distance D between the neighboring figures in the second set of color steps CS2 is not greater than the noise mixing width W1 previously set at step S1 (FIG. 3). FIGS. 10(a) through 10(f) show generation of vignette image data when D>W1. The only difference of FIGS. 10(a) through 10(f) from the example of FIGS. 8(a) through 8(f) is the noise offset SF. The noise offset SF shown in FIG. 10(c) shows a step-like distribution of the height 0 through 9 in an area of the noise mixing width W1 from the boundary of every neighboring figures of the second set of color steps CS2 while maintaining the value '0' in the residual areas. The possible range of the binary noise data BS is accordingly restricted in an area within the noise mixing width W1 down from the boundary of every neighboring figures.

After the vignette image data VID are generated according to the steps of FIGS. 4 and 5, the page description program correction unit 69 (FIG. 1) executes the processing of steps S7 and S8 in the flowchart of FIG. 3. At step S7, the vignette image data VID are converted to a page description program. The page description program corresponding to the vignette image data VID shown in FIG. 9 is expressed as:

---

[Program listing 4]

%%BoundingBox: 0 0 xxx xxx
%ImageData: xxx xxx 8 4 1 xxx 2 "beginimage"
newpath
143 175 moveto
0 175 lineto
0 226 lineto
143 226 lineto
143 175 lineto
clip
144.2664 173.542 moveto
2.0495 173.542 lineto
2.0495 224.9086 lineto
144.2664 224.9086 lineto
144.2664 173.542 lineto
clip
. . .
. . .
. . .
293.7336 1.558 moveto
243.9505 1.558 lineto
243.9505 96.0914 lineto
293.7336 96.0914 lineto
293.7336 1.558 lineto
clip
295 0 moveto
246 0 lineto
246 95 lineto
295 95 lineto
295 0 lineto
clip
%%BeginBinary: xxxxxx -continued

[Program listing 4]

beginimage
4C4C4C4C4C4C4C4C4C4C4C4C4C4C4C4C4C4C4C4C4C4C4C4C4C4C4C-
4C4C4C4C4C4C4C4C4C4C4C4C4C4C4C4C4C4C4C4C4C4C4C4C4C4C4C-
4C4C4C4C4C4C4C4C4C4C4C4C4C4C4C4C4C
...
...
...
797979797979797979797979797979797979797979797979797979-
797979797979797979797979797979797979797979797979797979-
797979797979797979797979797979797979797979797979797979-
797979797979797979
%%EndBinary
grestore end
grestore The operator 'clip' shows a contour of an area to be filled out, that is, a cut-out area. The page description program of the Program listing 4 includes 121 subroutines, each subroutine beginning with the operator 'moveto' and ending with the operator 'clip', and picture data arranged after the operator 'biginimage'. The 121 subroutines respectively correspond to the 121 figures of the second set of color steps CS2. The coordinates of the operators 'moveto' and 'lineto' are in a u-v coordinates system (FIG. 9) in the frame memory 64. In other words, the coordinates of 'moveto' and 'lineto' are determined by subtracting the offset (xmin, ymin)=(82, 309.5) from the corresponding coordinates in the Program listing 3 described before. The program of the Program listing 4 connects contours of the 121 figures shown in FIG. 7 with one another and generates an envelope curve surrounding the 121 figures (contour of the vignette image data shown in FIG. 9) as a cut-out area.

The Program listing 4 determines a cut-out area as a logical sum of the figures of the second set of color steps CS2. The cut-out area may, however, be determined alternatively as a logical sum of the figures of the first set of color steps CS1. In a concrete processing, when the boundary smoothing switch SW is set equal to one at step S1 in the flowchart of FIG. 3, the logical sum of the figures of the second set of color steps CS2 is used as a cut-out area. When the boundary smoothing switch SW is equal to zero, on the other hand, the logical sum of the figures of the first set of color steps CS1 is used as a cut-out area.

The picture data arranged after the operator 'biginimage' in the Program listing 4 show values of the respective pixels of the vignette image data VID shown in FIG. 9. The image data of each pixel are expressed with two digits or characters in hexadecimal notation. The picture data are arranged in the order of C, M, Y, K according to the line interleaving technique. This means one scanning line of picture data are arranged first for the C color separation, which are followed by one scanning line of picture data for the M separation, those for the Y separation, and those for the K separation. In the Program listing 4, picture data of the first several lines '4C4C . . . 4C' represents one scanning line of data for the C separation.

At step S8 in the flowchart of FIG. 3, the component programs corresponding to the figures extracted at step S4 in the original page description program, which is supplied from the image processing workstation 30, are substituted by the page description program representing a vignette image, or the Program listing 4. At this moment, the coordinates of each operator 'moveto' or 'lineto' in the Program listing 4 are increased by the offset (xmin, ymin)=(82, 309.5).

After completion of step S8, the procedure returns to step S3 at which it is determined whether any non-processed component program still exists in the original page description program. When the processing has been completed for all the component programs, the program goes from step S3 to step S9, at which the corrected page description program PDPa is output from the vignette conversion unit 42 to the interpreter 44 (FIG. 1). The interpreter 44 interprets the corrected page description program PDPa, generates image data ID representing characters, figures, and pictures, and supplies the image data ID to the RIP 46. The image recorder unit 50 finally records an image according to raster data RD output from the RIP 46.

As described before, the vignette conversion unit 42 converts a page description program representing a set of color steps to another page description program representing a vignette. The image recorder unit 50 can thus create a vignette even when the image processing workstation 30 does not have a function of generating a vignette.

C. Details of Figure Extraction Process

Figure 11:
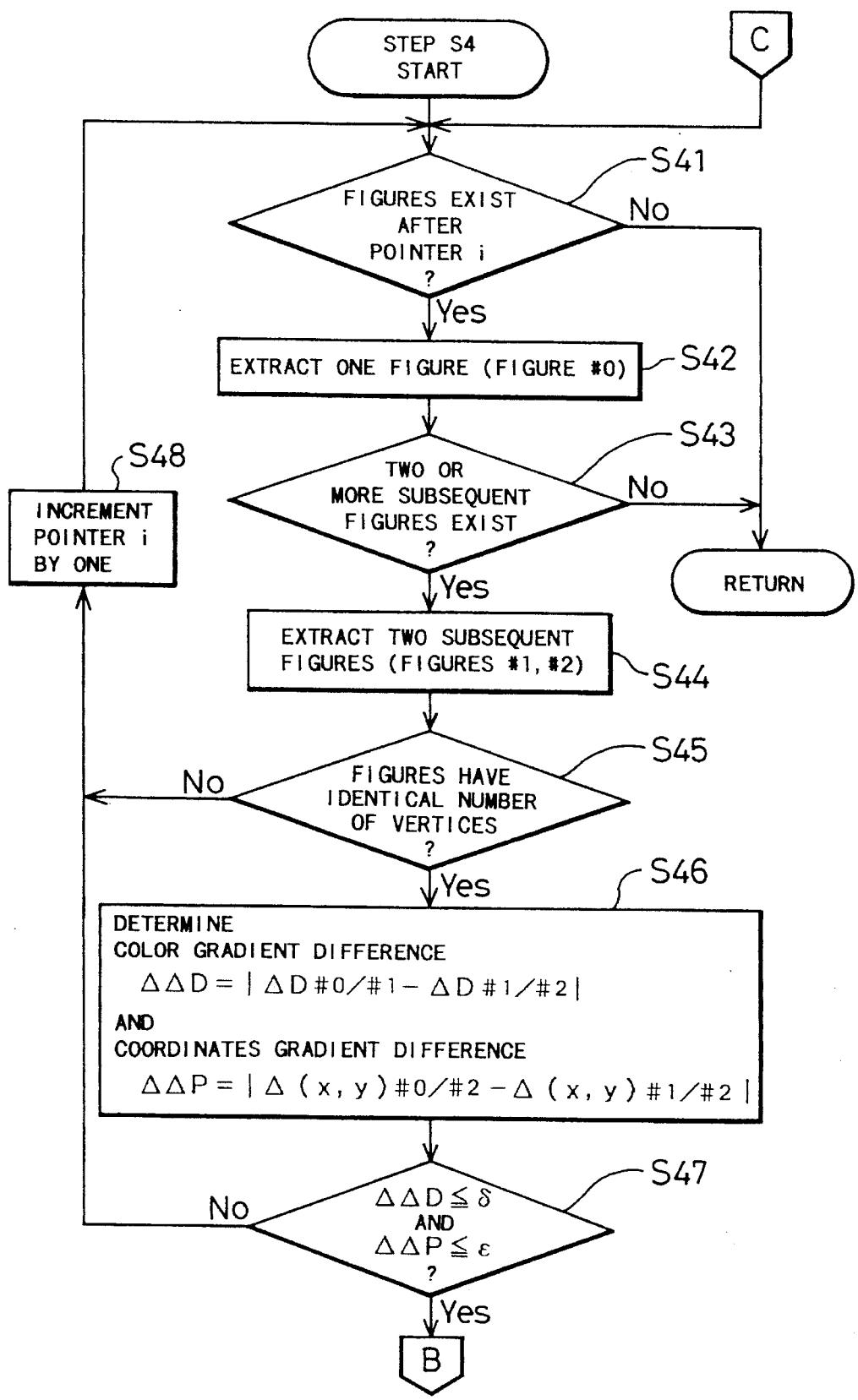
FIG. 11 is a flowchart showing details of the figure extraction routine.
Figure 12:
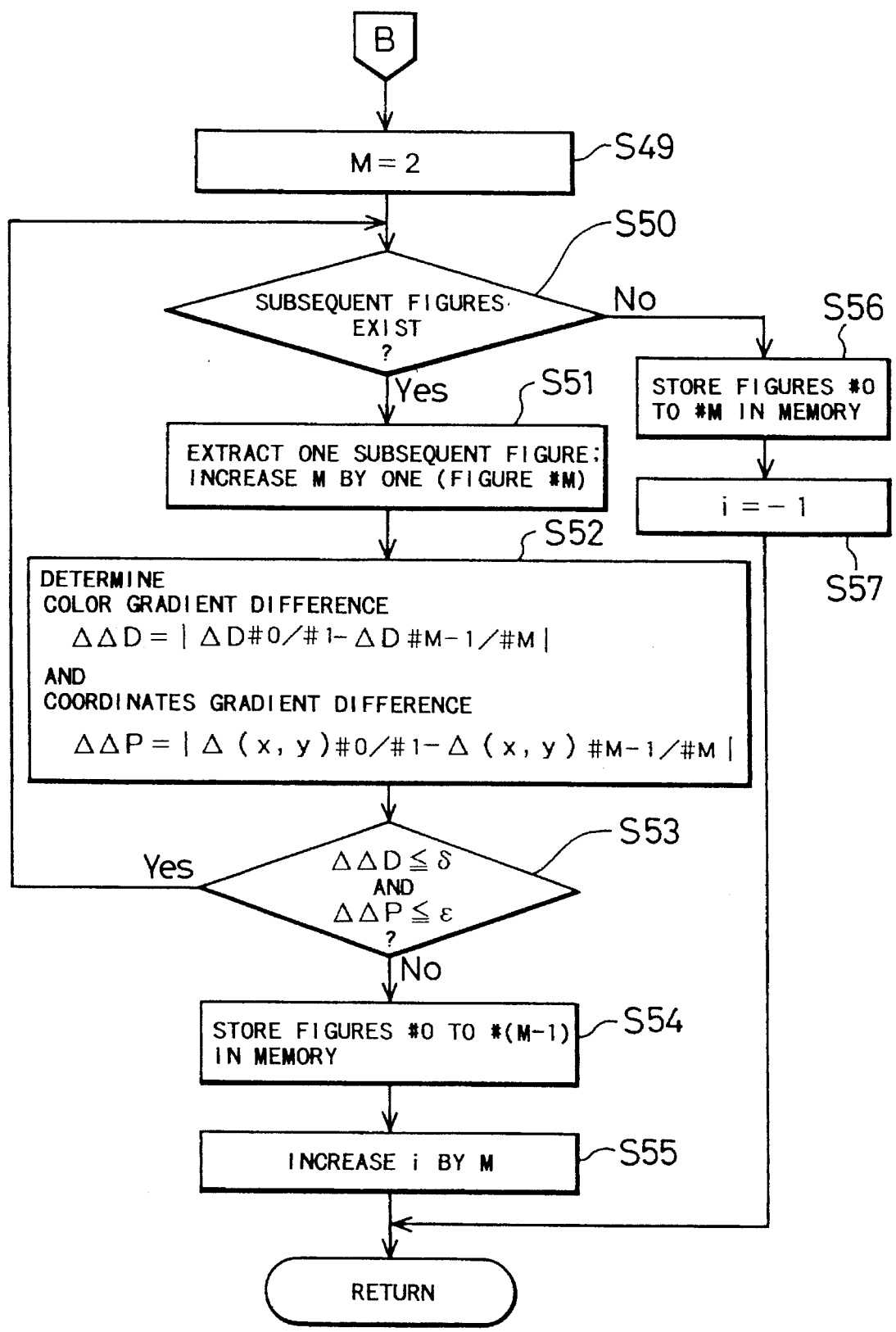
FIG. 12 is a flowchart showing details of the figure extraction routine.
Figure 13:
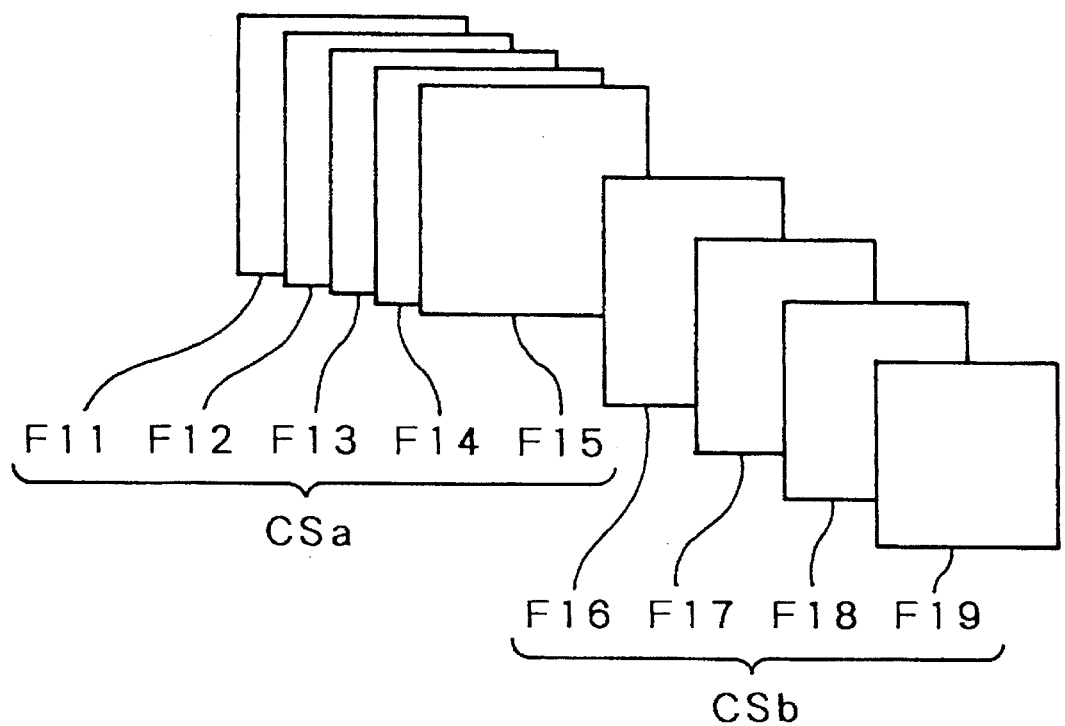
FIG. 13 is a plan view illustrating an example of one page image subject to the figure extraction process.
Figure 14:
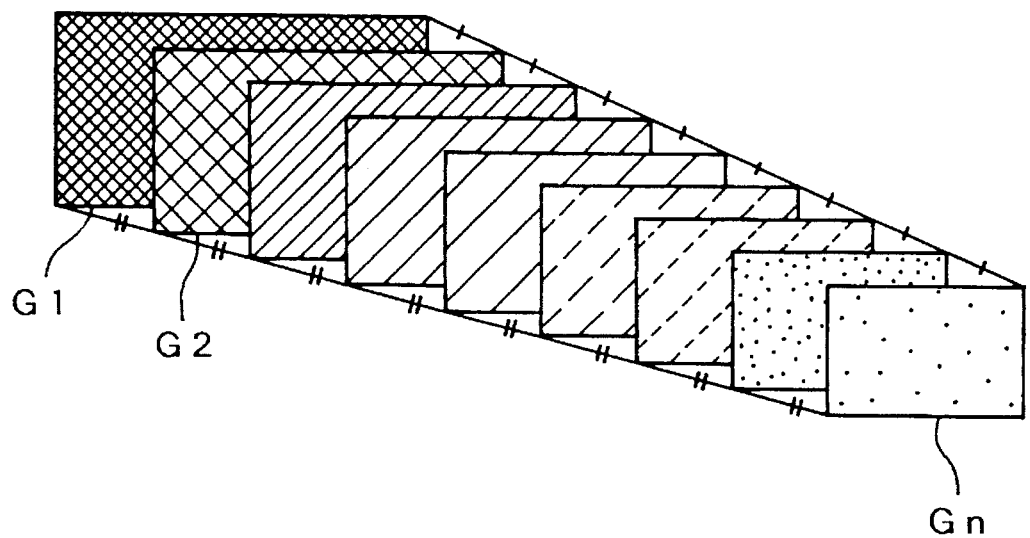
FIG. 14 is a plan view illustrating an example of the color steps.
Figure 15:
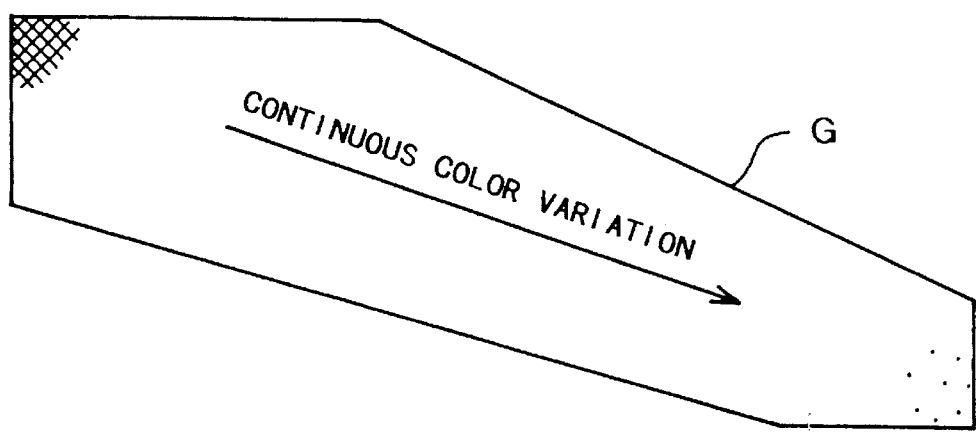
FIG. 15 is a plan view illustrating an example of the vignette.

FIGS. 11 and 12 are flowcharts showing the details of the step S4 in the flowchart of FIG. 3 for extracting figures constituting color steps from a plurality of figures included in a page description program. FIG. 13 is a plan view illustrating an example of a one-page image as a subject of the figure extraction process.

A page description program representing an image shown in FIG. 13 includes component programs for nine figures F11 through F19. Five component programs arranged in the first half of the page description program represent a set of color steps CSa corresponding to the five figures F11 through F15 whereas four component programs arranged in the second half of the page description program represent another set of color steps CSb corresponding to the four figures F16 through F19. These two sets of color steps CSa and CSb are to be converted to respective vignettes. The page description program, however, does not have a description indicating that the nine figures are divided into the two sets of color steps and the two sets of color steps CSa and CSb are to be converted into separate vignettes, but simply includes the nine component programs for defining the shapes and colors of the nine figures. Figures constituting color steps are extracted according to the procedure shown in FIGS. 11 and 12.

At step S41 in the flowchart of FIG. 11, it is determined whether any component program representing a figure exists after a pointer i in the page description program. The pointer i is a parameter showing the sequence of component programs in the page description program and is initialized to zero at step S2 in the flowchart of FIG. 3. In this specification, the term 'figure' means either the figure itself or the component program describing the figure. When no component program exists after the pointer i at step S41, the processing of step S4 is concluded. When any component program exists at step S41, on the contrary, the procedure proceeds to step S42.

At step S42, one component program describing a figure is extracted and stored in the memory. The figure extracted at step S42 is hereinafter referred to as 'figure #0'. In the example of FIG. 13, the back-most figure F11 becomes the figure #0.

At step S43, it is determined whether two or more figures exist after the figure #0. The processing of step S4 is directed to extract figures which may be converted to a vignette, and at least three figures are required for vignette conversion. When no or only one figure exists after the figure #0 at step S43, the processing of step S4 is concluded.

When at least two figures exist after the figure #0, the first two figures (hereinafter referred to as figures #1 and #2) are extracted at step S44. In the example of FIG. 13, the figures F12 and F13 are extracted as the figures #1 and #2.

At step S45, it is determined whether the three figures #0, #1, and #2 have an identical number of vertices. As clearly shown in the Program listing 1, for example, each component program includes coordinates of vertices of a figure. The number of vertices are determined through analysis of the component program. If a contour of a figure is defined by a Bezier curve, end points and control points of the Bezier curve can be treated as vertices of the figure.

When the three figures #0, #1, and #2 dot not have an identical number of vertices, these figures are not converted to a vignette. The procedure thereby goes from step S45 to step S48 at which the pointer i is increased by one, and then returns to step S41. It means that the processing after step S41 is to be executed for the second component program in the page description program. The processing is resumed for the second component program because the second and subsequent figures may be converted to a vignette although the first figure is not suit for the vignette conversion. In the example of FIG. 13, the first three figures #0, #1, and #2 (that is, figures F11, F12, and F13) have an identical number of vertices, and the processing after step S46 is executed accordingly.

At step S46, a color gradient difference $\Delta\Delta D$ and a coordinate gradient difference $\Delta\Delta P$ are calculated for the three figures #0, #1, and #2. The color gradient difference $\Delta\Delta D$ is defined by:

$$\Delta\Delta D = |\Delta D_{\#0/\#1} - \Delta D_{\#1/\#2}|$$

$$\Delta D_{\#i/\#j}(C) = C_{\#i} - C_{\#j}$$

$$\Delta D_{\#i/\#j}(M) = M_{\#i} - M_{\#j}$$

$$\Delta D_{\#i/\#j}(Y) = Y_{\#i} - Y_{\#j}$$

$$\Delta D_{\#i/\#j}(K) = K_{\#i} - K_{\#j}$$

wherein a color gradient $\Delta D_{\#i/\#j}$ represents a difference in color data between figures #i and #j and includes four components $\Delta D_{\#i/\#j}(C)$, $\Delta D_{\#i/\#j}(M)$, $\Delta D_{\#i/\#j}(Y)$, and $\Delta D_{\#i/\#j}(K)$ for the four colors C, M, Y, and K. Since the color gradient $\Delta D_{\#i/\#j}$ is a difference in color data, the color gradient difference $\Delta\Delta D$ corresponds to a quadratic difference in color data.

The coordinate gradient difference $\Delta\Delta P$ is defined by:

$$\Delta\Delta P = |\Delta(x,y)_{\#0/\#1} - \Delta(x,y)_{\#1/\#2}|$$

$$\Delta(x,y)_{\#i/\#j} = (x,y)_{\#i} - (x,y)_{\#j}$$

wherein $\Delta(x,y)_{\#i/\#j}$ denotes a difference in coordinates between the corresponding vertices of the figures #i and #j and is calculated for each vertex.

At step S47, it is determined whether the color gradient difference $\Delta\Delta D$ and the coordinate gradient difference $\Delta\Delta P$ are not greater than allowable errors $\delta$ and $\epsilon$, respectively. When the three figures #0, #1, and #2 constitute color steps, these differences $\Delta\Delta D$ and $\Delta\Delta P$ should be substantially equal to zero. On condition that both $\Delta\Delta D \leq \delta$ and $\Delta\Delta P \leq \epsilon$ hold, the three figures #0, #1, and #2 are recognized as constituents of color steps and the processing after step S49 in the flowchart of FIG. 12 is executed. When at least one of the differences $\Delta\Delta D$ and $\Delta\Delta P$ is greater than the allowable error at step S47, on the other hand, the three figures #0, #1, and #2 are determined not to constitute color steps, The procedure accordingly goes from step S47 to step S48 at which the pointer i is increased by one, and returns to step S41. For example, the allowable error $\delta$ of the color gradient difference $\Delta\Delta D$ is set equal to 0.01% whereas the allowable error $\epsilon$ of the coordinate gradient difference $\Delta\Delta P$ is equal to 0.0001 point.

At step S49 in the flowchart of FIG. 12, a parameter M representing the number of extracted figures is set equal to two. More precisely, the parameter M is set equal to a value obtained by subtracting one from the actual number of extracted figures.

At step S50, it is determined whether component programs representing any subsequent figures exist in the page description program under processing. When any subsequent figures exist, the procedure goes to step S51 at which one figure is extracted out of the subsequent figures and the parameter M is increased by one. In the example of FIG. 13, the three figures F11, F12, and F13 have already been extracted in the process prior to step S49 and the fourth figure F14 is extracted at step S51. The figure extracted at step S51 is referred to as 'figure #M', where M is the parameter indicating the number of extracted figures. In the example of FIG. 13, the figure F14 becomes the figure #3.

When no subsequent component program exists at step S50, the procedure goes to step S56 at which the three figures #0, #1, and #2 extracted at steps S41 through S47 are recognized as a group of figures, and the component programs corresponding to these three figures #0, #1, and #2 are stored in the memory. The procedure then proceeds to step S57 at which the pointer i is set equal to −1 (representing completion of the processing) to complete the processing of step S4.

At step S52, the color gradient difference $\Delta\Delta D$ and the coordinate gradient difference $\Delta\Delta P$ are calculated for two pairs of figures {#0, #1} and {#M−1, #M}, which are located at the both ends of the (M+1) pieces of figures from the figure #0 to the figure #M. These differences dAD and $\Delta\Delta P$ calculated at step S52 are expressed by:

$$\Delta\Delta D = |\Delta D_{\#0/\#1} - \Delta D_{\#M-1/\#M}|$$

$$\Delta\Delta P = |\Delta(x,y)_{\#0/\#1} - \Delta(x,y)_{\#M-1/\#M}|$$

At step S53, it is determined whether the color gradient difference $\Delta\Delta D$ and the coordinate gradient difference $\Delta\Delta P$ calculated at step S52 are not greater than the allowable errors $\delta$ and $\epsilon$, respectively. These allowable errors are identical with those used at step S47 in the flowchart of FIG. 11. When both the differences $\Delta\Delta D$ and $\Delta\Delta P$ are within the allowable errors, the procedure returns to step S50 to execute the processing after step S50 for a next figure.

At step S46 described before, it is confirmed that the first two pairs of figures {#0, #1} and {#1, #2} have substantially identical color gradient $\Delta D$ and coordinates gradient $\Delta(x,y)$. If it is confirmed at steps S52 and S53 that the two pairs of end figures {#0, #1} and {#M−1, #M} of the extracted figures have substantially identical color gradient $\Delta D$ and coordinates gradient $\Delta(x,y)$, every pair of neighboring figures among the (M+1) pieces of figures from the figure #0 to the figure #M have substantially identical color gradient ΔD and coordinates gradient Δ(x,y).

When at least one of the differences ΔΔD and ΔΔP is greater than the allowable error at step S53, the procedure proceeds to step S54 at which the extracted figures #0 through #(M-1) are recognized as a group of figures, and the component programs corresponding to these figures are stored in the memory. The procedure then proceeds to step S55 at which the pointer i is increased by the value M, and exits from the processing of step S4. In the example of FIG. 13, the first five figures F11 through F15 are extracted as one group of figures by the processing of steps S41 through S54, and the pointer i is set equal to 5 at step S55 before the program returning to step S41.

When one group of figures are extracted at step S4, the processing of steps S5 through S8 in the flowchart of FIG. 3 is executed for the extracted figures to create a page description program representing a vignette. In the re-execution of step S4, the processing starts from a figure next to the pointer i set at step S55 (FIG. 12). In the example of FIG. 13, the second cycle of the routine of steps S41 through S54 extracts the latter four figures F16 through F19 as another group of figures.

Accordingly, the figure extraction process of step S4 extracts each group of figures out of a plurality of figures included in one page image, and the vignette conversion is executed for each group of figures.

Incidentally, the conditions on which figures are extracted at step S4 (steps S47 and S53) are different from the vignette conversion condition at step S5 described before. Conversion of color steps to a vignette can thus be specified by appropriately setting these conditions. For example, it is possible to set the conditions so that only the first five figures F11 through F15 shown in FIG. 13 are converted to a vignette while the latter four figures F16 through F19 are kept as color steps.

D. Modifications (1) A plurality of figures constituting color steps may be other types of figures other than polygons, such as curves, circles, ellipses, and closed figures including one or more Bezier curves. For closed figures including Bezier curves, color steps is formed so that the end points and the control points of the Bezier curves are arranged on respective straight lines.

Figure 8:
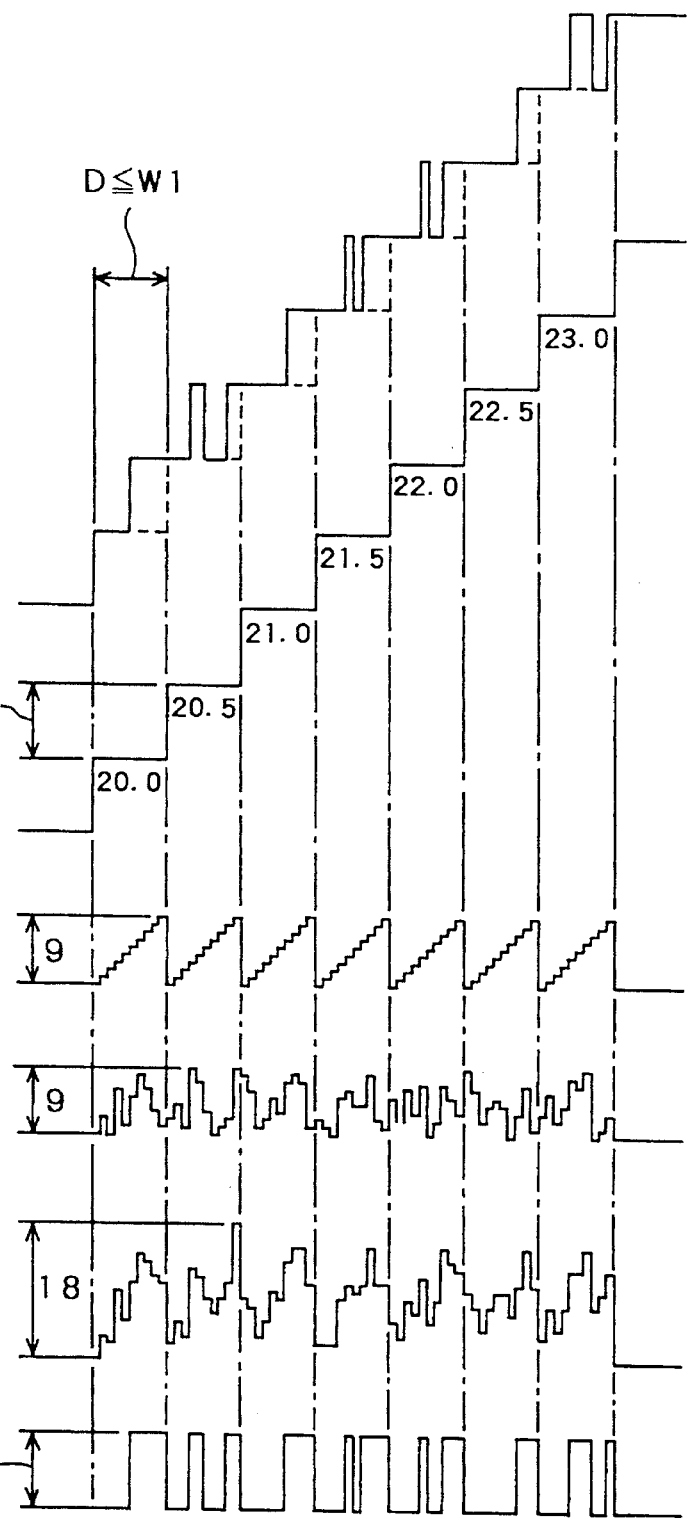
FIGS. 8(a) through 8(f) show steps of generating vignette image data when a value D is not greater than W1.
Figure 10:
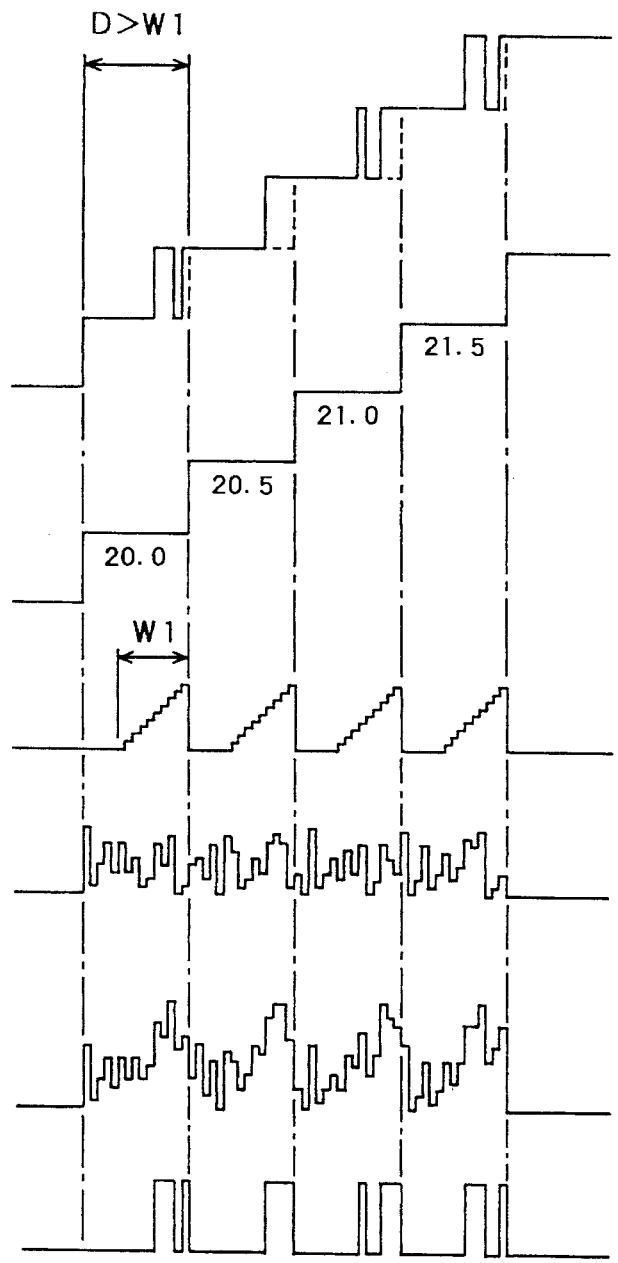
FIGS. 10(a) through 10(f) show steps of generating vignette image data when a value D is greater than W1.

(2) Although the range of the noise offset and that of the random noise are set identical with each other as shown in FIGS. 8 and 10 in the above embodiment, these ranges can be different from each other. An alternative method does not use a noise offset but adds a random noise in the vicinity of the boundary of neighboring figures. Conversion to binary data after addition of the noise offset to the random noise as in the embodiment can, however, easily make the binary noise data BS concentrated in the vicinity of the boundary of the neighboring figures.

(3) Vignette image data can be generated by adding random noise data having a smaller number of bits than color data, instead of the binary noise data BS shown in FIGS. 8 and 10, to the bit map data of the second color step.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of generating vignette image data approximately representing a vignette image having a continuous linear color variation, comprising the steps of:

providing first color step image data representing a first set of color step image including a plurality of figures which are arranged at equal intervals along a predetermined direction to be laid one upon another and filled uniformly with different colors, shapes and colors of said plurality of figures changing linearly in order;

determining, based on said first set of color step image data, a difference between first color data indicating a color of a first figure arranged in a back-most position among said plurality of figures and second color data indicating a color of a second figure arranged in a front-most position among said plurality of figures;

dividing said difference by a predetermined step width to obtain an integer N;

generating a second set of color step image which comprises (N+1) pieces of figures including said first figure, said second figure, and (N−1) pieces of figures arranged between said first and second figures at equal intervals, and generating second color step image data representing a color of each pixel in said second set of color step image;

generating a color data noise with respect to every neighboring pair of said (N+1) pieces of figures, within a predetermined range from a boundary of said every neighboring pair; and adding said color data noise to said second set of color step image data to generate vignette image data approximately representing a vignette image.

2. A method in accordance with claim 1, wherein said step of generating the color data noise comprises the steps of:

generating a noise offset whose value has a predetermined variation within said predetermined range;

generating a random noise at least within said predetermined range;

adding said noise offset and said random noise to obtain a multi-digital noise; and binarizing said multi-digital noise to obtain said color data noise.

3. A method in accordance with claim 2, wherein a maximum value of said noise offset is equal to a maximum value of said random noise.

4. A method in accordance with claim 3, wherein said step of binarizing comprises the step of binarizing said multi-digital noise by said maximum value of said noise offset and said random noise.

5. A method in accordance with claim 1, wherein said step of providing said first set of color step image data comprises the step of providing said first set of color step image data expressed by a first page-description-program; and said step of generating said second set of color step image data comprises the step of generating said second set of color step image data expressed by a second page-description-program.

6. A method in accordance with claim 5, further comprising the steps of before said step of determining said difference, extracting a plurality of component programs describing said plurality of figures from said first page description program; and wherein said step of generating said second set of color step image further comprises the step of generating (N−1) pieces of component programs describing said (N−1) pieces of figures arranged between said first and second figures.

7. A method in accordance with claim 6, wherein said step of extracting said plurality of component programs comprises the steps of:

examining a color data difference and a positional difference for neighboring pairs of said plurality of figures; and extracting at least three component programs describing figures which has substantially identical values of said color data difference and said positional difference, respectively.

8. An apparatus for converting first color step image data representing a first set of color-step image to vignette image data approximately representing a vignette image having a continuous linear color variation, said first color step image consisting of a plurality of figures which are arranged at equal intervals along a predetermined direction to be laid one upon another and filled uniformly with different colors, shapes and colors of said plurality of figures changing linearly in order, said apparatus comprising:

means for determining, based on said first set of color step image data, a difference between first color data indicating a color of a first figure arranged in a back-most position among said plurality of figures and second color data indicating a color of a second figure arranged in a front-most position among said plurality of figures, and dividing said difference by a predetermined step width to obtain an integer N;

image correction means for generating a second set of color step image which comprises (N+1) pieces of figures including said first figure, said second figure, and (N−1) pieces of figures arranged between said first and second figures at equal intervals, and generating second color step image data representing a color of each pixel in said second set of color step image;

noise generation means for generating a color data noise with respect to every neighboring pair of said (N+1) pieces of figures, within a predetermined range from a boundary of said every neighboring pair; and addition means for adding said color data noise to said second set of color step image data to generate vignette image data approximately representing a vignette image.

9. An apparatus in accordance with claim 8, wherein said noise generation means comprises:

means for generating a noise offset whose value has a predetermined variation within said predetermined range;

means for generating a random noise at least within said predetermined range;

means for adding said noise offset and said random noise to obtain a multi-digital noise; and means for binarizing said multi-digital noise to obtain said color data noise.

10. An apparatus in accordance with claim 9, wherein a maximum value of said noise offset is equal to a maximum value of said random noise.

11. An apparatus in accordance with claim 10, wherein said means for binarizing comprises means for binarizing said multi-digital noise by said maximum value of said noise offset and said random noise.

12. An apparatus in accordance with claim 8, wherein said first set of color step image data is expressed by a first page-description-program; and said image correction means comprises means for generating said second set of color step image data expressed by a second page-description-program.

13. An apparatus in accordance with claim 12, further comprising extraction means for extracting a plurality of component programs describing said plurality of figures from said first page description program; and wherein said image correction means further comprises means for generating (N−1) pieces of component programs describing said (N−1) pieces of figures arranged between said first and second figures.

14. An apparatus in accordance with claim 13, wherein said extraction means comprises means for examining a color data difference and a positional difference for neighboring pairs of said plurality of figures; and means for extracting at least three component programs describing figures which has substantially identical values of said color data difference and said positional difference, respectively.

* * * * *